US011884299B2

(12) United States Patent
Hosoi et al.

(10) Patent No.: US 11,884,299 B2
(45) Date of Patent: Jan. 30, 2024

(54) VEHICLE TRAVELING CONTROL DEVICE, VEHICLE TRAVELING CONTROL METHOD, CONTROL CIRCUIT, AND STORAGE MEDIUM (71) Applicant: Mitsubishi Electric Corporation, Tokyo (JP)

(72) Inventors: Kyoko Hosoi, Tokyo (JP); Kenichi Nakura, Tokyo (JP); Takeshi Suehiro, Tokyo (JP); Takashi Sugihara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 537 days.

(21) Appl. No.: 17/112,492

(22) Filed: Dec. 4, 2020

(65) Prior Publication Data

US 2021/0086791 A1     Mar. 25, 2021

Related U.S. Application Data (63) Continuation of application No. PCT/JP2018/022264, filed on Jun. 11, 2018.

(51) Int. Cl.
*B60W 60/00*    (2020.01)
*B60W 30/09*    (2012.01)
(Continued)

(52) U.S. Cl.
CPC ........ *B60W 60/0016* (2020.02); *B60W 30/09* (2013.01); *B60W 30/0956* (2013.01);
(Continued)

(58) Field of Classification Search
CPC ............. B60W 30/09; B60W 30/0956; B60W 60/0016; B60W 2050/0215;
(Continued)

(56) References Cited

U.S. PATENT DOCUMENTS 9,378,047 B1    6/2016  Gould et al.
9,672,736 B2 *  6/2017  Lovell .................... G08G 1/164
(Continued)

FOREIGN PATENT DOCUMENTS

JP          2018-25957 A      2/2018

*Primary Examiner* — Anshul Sood
(74) *Attorney, Agent, or Firm* — BIRCH, STEWART, KOLASCH & BIRCH, LLP (57) ABSTRACT A vehicle traveling control device includes: a communicator periodically receiving a dynamic map; a sensor management circuit collecting, from one or more sensors measuring a state of objects around a vehicle, a result of measurement representing the state of objects around the vehicle; a surrounding information comparator comparing object data represented by the dynamic map with object data represented by the result of measurement, and in response to finding mismatching object data, detecting, from the mismatching object data, data of the dynamic map representing an object within a specified range from the vehicle; and a proximity information processor setting, from the data of the dynamic map detected by the surrounding information comparator, data representing the vehicle as an avoidance non-target object in traveling control, and setting data representing an object other than the vehicle as an avoidance target object in traveling control or the avoidance non-target object.

13 Claims, 5 Drawing Sheets (51) Int. Cl.
  *G08G 1/16* (2006.01)
  *B60W 30/095* (2012.01)
  *B60W 50/02* (2012.01)

(52) U.S. Cl.
  CPC .............. *G08G 1/16* (2013.01); *G08G 1/166* (2013.01); *B60W 2050/0215* (2013.01); *B60W 2554/40* (2020.02); *B60W 2556/40* (2020.02); *B60W 2556/45* (2020.02)

(58) Field of Classification Search
  CPC ......... B60W 2554/40; B60W 2556/40; B60W 2556/45; G08G 1/16; G08G 1/166
  See application file for complete search history.

(56) References Cited

U.S. PATENT DOCUMENTS

| | | | |
|---|---|---|---|
| 10,019,900 | B2 | 7/2018 | Shimotsuma et al. |
| 2017/0307398 | A1* | 10/2017 | Iwaasa .................... G06F 16/29 |
| 2018/0047287 | A1* | 2/2018 | Shimotsuma .......... G06V 20/58 |
| 2019/0251743 | A1* | 8/2019 | Koyama ................. G06T 15/10 |
| 2019/0316913 | A1* | 10/2019 | Golov ..................... G01C 21/30 |
| 2019/0323855 | A1* | 10/2019 | Mahler ............... G01C 21/3841 |
| 2021/0001882 | A1* | 1/2021 | Mortazavi ............. B60W 40/04 |

* cited by examiner

VEHICLE TRAVELING CONTROL DEVICE, VEHICLE TRAVELING CONTROL METHOD, CONTROL CIRCUIT, AND STORAGE MEDIUM

CROSS-REFERENCE TO RELATED APPLICATION

This application is a continuation application of International Application PCT/JP2018/022264, filed on Jun. 11, 2018, and designating the U.S., the entire contents of which are incorporated herein by reference.

BACKGROUND OF THE INVENTION

1. Field of the Invention

The present disclosure relates to a vehicle traveling control device, a vehicle traveling control method for controlling traveling of a vehicle, a control circuit, and a storage medium.

2. Description of the Related Art

An automatic travel vehicle that travels automatically is equipped with a vehicle-mounted sensor that measures the state of surroundings, and controls automatic traveling using results of measurement of the vehicle-mounted sensor. The automatic travel vehicle can also recognize the state of surroundings that are in a blind area of range of the vehicle-mounted sensor by acquiring what is called a dynamic map (hereinafter referred to as a DM) that is updated frequently based on measurement results of the surroundings of a roadside sensor measured by the roadside sensor. Patent Literature (Japanese Patent Application Laid-open No. 2018-25957) discloses a technique in which a vehicle-mounted device reconstructs a DM using a DM acquired from a server and results measured by a vehicle-mounted sensor and uses the reconstructed DM to control traveling of a vehicle.

However, in the vehicle-mounted device described in Patent Literature 1, a measurement time error, a measurement error, or the like may occur between a result of measurement of the vehicle-mounted sensor and a DM in the surroundings of the vehicle having the vehicle-mounted device installed therein. In this case, the vehicle-mounted device described in Patent Literature 1 may misidentify one object as two or more objects as a result of use of the result of measurement of the vehicle-mounted sensor and the DM, and has a possibility to cause the vehicle to operate abnormally, e.g. to stop suddenly or accelerate suddenly, in an attempt to avoid the misidentified object. This has been problematic.

The present disclosure has been made in view of the above circumstances, and an object thereof is to provide a vehicle traveling control device that prevents abnormal operation caused by misidentification of an obstacle during automatic traveling control using a measurement result of a vehicle-mounted sensor and a dynamic map.

SUMMARY OF THE INVENTION

In order to solve the above-mentioned problems and achieve the object, the present disclosure provides a vehicle traveling control device comprising: a communicator to periodically receive a dynamic map representing a state of objects; a vehicle-mounted sensor management circuit to collect, from one or more sensors mounted on a vehicle to measure a state of objects around the vehicle, a result of measurement representing the state of objects around the vehicle; a surrounding information comparator to compare object data represented by the dynamic map with object data represented by the result of measurement, and in response to finding mismatching object data, detect, from the mismatching object data, data of the dynamic map representing an object located within a specified range from the vehicle; and a proximity information processor to set, from the data of the dynamic map detected by the surrounding information comparator, data representing the vehicle as an avoidance non-target object that is an object to be excluded from objects to be avoided in traveling control for the vehicle, and set data representing an object other than the vehicle as an avoidance target object that is an object to be avoided in traveling control for the vehicle or as the avoidance non-target object.

DETAILED DESCRIPTION OF THE PREFERRED EMBODIMENTS

Hereinafter, a vehicle traveling control device and a vehicle traveling control method according to embodiments of the present disclosure will be described in detail with reference to the drawings. The present disclosure is not necessarily limited by these embodiments.

First Embodiment

Figure 1:
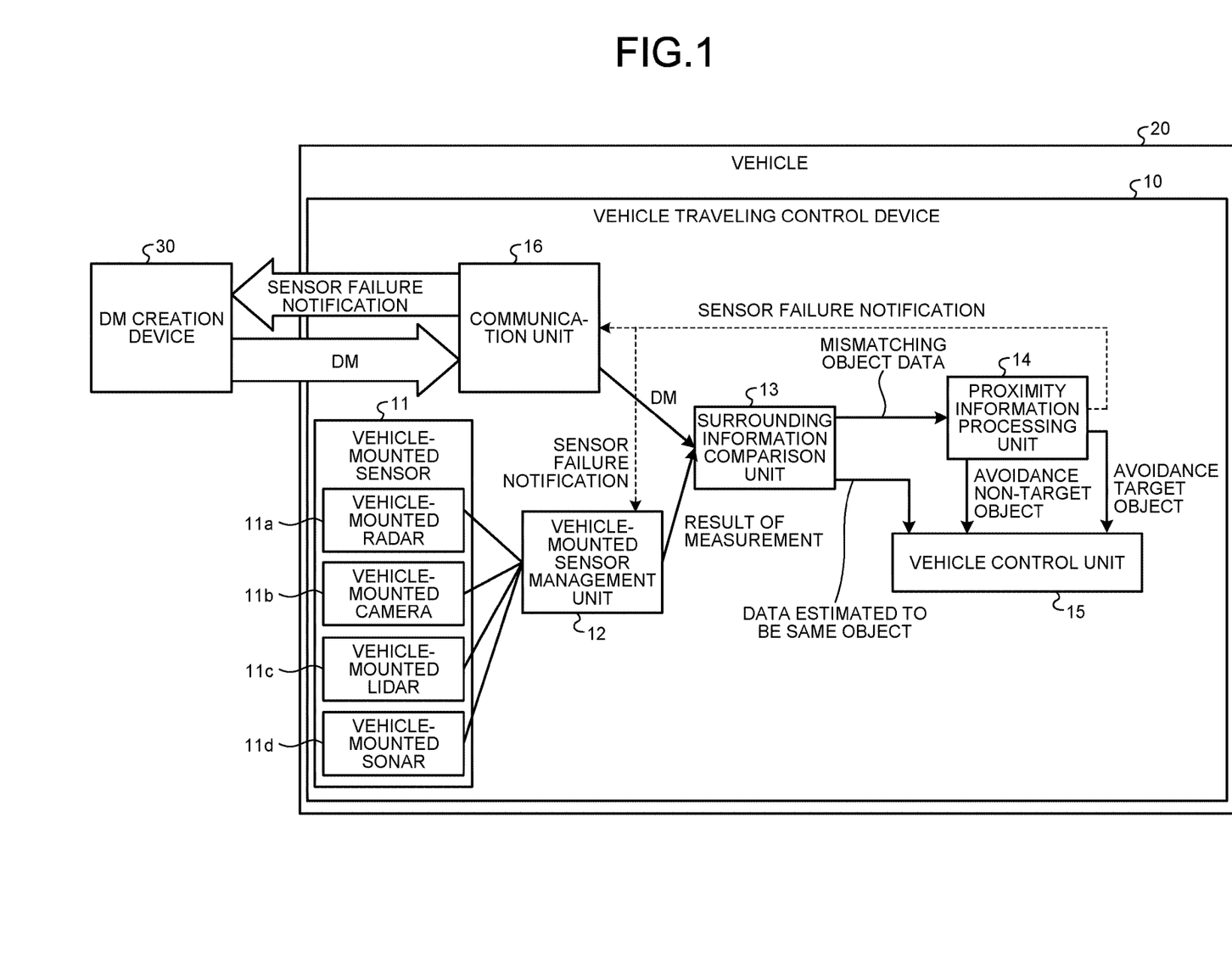
FIG. 1 is a block diagram illustrating a configuration example of a vehicle traveling control device according to a first embodiment.

FIG. 1 is a block diagram illustrating a configuration example of a vehicle traveling control device 10 according to the first embodiment of the present disclosure. The vehicle traveling control device 10 is mounted on a vehicle 20 and controls automatic traveling of the vehicle 20. The vehicle 20 is a car that travels automatically. The vehicle traveling control device 10 connects with a DM creation device 30 by wireless communication and acquires a DM from the DM creation device 30. The DM creation device 30 is supposed to be installed on a roadside or the like outside the vehicle 20.

The DM creation device 30 periodically acquires a measurement result of a sensor from a roadside device (not illustrated) installed on the roadside and equipped with a sensor that measures the state of surrounding objects, a vehicle located within the coverage and equipped with a sensor that measures the state of surrounding objects, or the like. Measurement results of the sensor represent the state of objects around the sensor. A vehicle may be the vehicle 20 illustrated in FIG. 1 or a vehicle other than the vehicle 20, or may include both the vehicle 20 and another vehicle. The DM creation device 30 holds in advance map data describing roads and the like, and uses the map data and the acquired measurement results of the sensor to create a DM that shows information representing the state of the surrounding objects, that is, information on dynamic objects on the map data. In a DM, a dynamic object on the map data is, for example, a vehicle, a pedestrian, or the like. Information on a dynamic object is a position, a size, a moving speed, or the like of a vehicle, a pedestrian, or the like. The DM creation device 30 periodically distributes created DMs to surrounding vehicles. Note that the DM creation device 30 may create a DM with acquiring measurement results of sensors from a plurality of roadside devices and a plurality of vehicles, and the number of measurement results of the used sensors is not limited. The DM creation device 30 creates a DM using at least one of a sensor measurement result provided by a roadside device and a sensor measurement result provided by a vehicle.

The configuration of the vehicle traveling control device 10 will be described. The vehicle traveling control device 10 includes a vehicle-mounted sensor 11, a vehicle-mounted sensor management unit 12, a surrounding information comparison unit 13, a proximity information processing unit 14, a vehicle control unit 15, and a communication unit 16.

The vehicle-mounted sensor 11 includes one or more sensors and measures the state of an object around the vehicle 20. In the example of FIG. 1, the vehicle-mounted sensor 11 includes four sensors: a vehicle-mounted radar 11$a$ that measures the surroundings of the vehicle 20 using radio waves, a vehicle-mounted camera 11$b$ that measures the surroundings of the vehicle 20 based on images, a vehicle-mounted light detection and ranging (lidar) device 11$c$ that measures the surroundings of the vehicle 20 using light, and a vehicle-mounted sonar device 11$d$ that measures the surroundings of the vehicle 20 using sound waves. The vehicle-mounted sensor 11 may include one or some of the four sensors illustrated in FIG. 1 or may include another sensor.

The vehicle-mounted sensor management unit 12 periodically collects results of measurement from the vehicle-mounted sensor 11, that is, the state of an object or objects around the vehicle 20 measured by the vehicle-mounted sensor 11. The vehicle-mounted sensor management unit 12 outputs the collected results of measurement of the vehicle-mounted sensor 11 to the surrounding information comparison unit 13.

The communication unit 16 receives DMs periodically distributed from the DM creation device 30, and outputs the periodically received DMs to the surrounding information comparison unit 13. The communication unit 16 also acquires a sensor failure notification (described later) from the proximity information processing unit 14, and transmits the acquired sensor failure notification to the DM creation device 30.

The surrounding information comparison unit 13 acquires a result of measurement of the vehicle-mounted sensor 11 from the vehicle-mounted sensor management unit 12, and acquires a DM created by the DM creation device 30 from the communication unit 16. The surrounding information comparison unit 13 compares the surrounding object information derived from the vehicle-mounted sensor 11, that is, object data represented by the result of measurement of the vehicle-mounted sensor 11, with the surrounding object information derived from the DM creation device 30, that is, object data represented by the DM. The surrounding information comparison unit 13 uses, for example, information such as the position, speed, and size of objects represented by the result of measurement of the vehicle-mounted sensor 11 and the data of each object in the DM to identify an object for which the result of measurement of the vehicle-mounted sensor 11 is matched in data content with the DM. The surrounding information comparison unit 13 may use one or more of the position, speed, and size of objects represented by the result of measurement of the vehicle-mounted sensor 11 and the data of each object in the DM to identify an object for which the result of measurement of the vehicle-mounted sensor 11 is matched in data content with the DM. The surrounding information comparison unit 13 estimates an object for which the result of measurement of the vehicle-mounted sensor 11 is matched in data content with the DM to be one and the same object, and outputs the data of the estimated object as the one and the same object to the vehicle control unit 15. The surrounding information comparison unit 13 may output the data of the estimated object as the one and the same object to the vehicle control unit 15 by outputting either the object data represented of the result of measurement by the vehicle-mounted sensor 11 or the object data represented by the DM or by outputting both of them.

When the result of measurement of the vehicle-mounted sensor 11 is not matched with object data identical or similar to the object data represented by the DM, the surrounding information comparison unit 13 estimates that the object data represented by the DM is low-likelihood data representing an obstacle or the vehicle 20. An object for which the result of measurement of the vehicle-mounted sensor 11 is not matched in data content with the DM is less likely to actually exist than an object for which the former is matched in data content with the latter. However, an object for which they are not matched in data content with each other is of high importance if it is near the vehicle 20 in order for the vehicle 20 to avoid collision with a surrounding object. Therefore, when the result of measurement of the vehicle-mounted sensor 11 and the DM contain any object for which their data contents are not matched with each other, the surrounding information comparison unit 13 detects, from the mismatching object data, DM data and data of the result of measurement of the vehicle-mounted sensor 11 representing an object located within a specified range from the vehicle 20, and outputs the detected object data to the proximity information processing unit 14. The specified range may be set in advance by the user in the surrounding information comparison unit 13, or may be dynamically set by the surrounding information comparison unit 13 in accordance with the density of objects around the vehicle 20.

The proximity information processing unit 14 determines whether or not an object to which there is no data identical or similar in the result of measurement of the vehicle-mounted sensor 11 and which is represented only by the DM data is the vehicle 20. The proximity information processing unit 14 compares, for example, the position, speed, and size of the object represented only by the DM data with the position, speed, and size of the vehicle 20, to determine whether or not the object represented only by the DM data is the vehicle 20. The proximity information processing unit 14 is supposed to have acquired information on the position, speed, and size of the vehicle 20. When the proximity information processing unit 14 determines that the object represented only by the DM data is the vehicle 20, the proximity information processing unit 14 sets the object represented only by the DM data as an avoidance non-target object that is an object to be excluded from avoidance targets in traveling control for the vehicle 20, because the object represented only by the DM data is unlikely to collide with the vehicle 20. In this case, when there is no other object represented only by the DM data and derived from the vehicle 20, the proximity information processing unit 14 determines that both the data of the result of measurement of the vehicle-mounted sensor 11 and the DM data are normal, and does not output a sensor failure notification representing a sensor failure.

When the proximity information processing unit 14 determines that the object represented only by the DM data is an object other than the vehicle 20, the proximity information processing unit 14 determines, on the basis of the relationship between the vehicle 20 and the object, whether or not the object represented only by the DM data should be an avoided target in automatic traveling of the vehicle 20 because this object may be an obstacle. For example, the proximity information processing unit 14 sets, as an avoidance target object that is an object to be avoided by the vehicle 20 under traveling control thereof, the DM data representing an object other than the vehicle 20 in which the object represented by the data is either an object traveling ahead of the vehicle 20 in the same traveling direction as the vehicle 20 at a lower traveling speed than the vehicle 20 or an object traveling behind the vehicle 20 in the same traveling direction as the vehicle 20 at a higher traveling speed than the vehicle 20. The proximity information processing unit 14 outputs information on the avoidance target object, that is, the DM data set as the avoidance target object, to the vehicle control unit 15. In this case, because either the sensor used in the DM creation device 30 or any of the sensors of the vehicle-mounted sensor 11 may have a failure, the proximity information processing unit 14 outputs a sensor failure notification representing a sensor failure to the DM creation device 30 via the communication unit 16 and to the vehicle-mounted sensor management unit 12, so as to provide a warning on a sensor failure.

For example, the proximity information processing unit 14 sets, as an avoidance non-target object that is an object for which no immediate avoidance action is required, the DM data representing an object other than the vehicle 20 in which the object represented by the data does not correspond to any of an object traveling ahead of the vehicle 20 in the same traveling direction as the vehicle 20 at a lower traveling speed than the vehicle 20 and an object traveling behind the vehicle 20 in the same traveling direction as the vehicle 20 at a higher traveling speed than the vehicle 20. The proximity information processing unit 14 outputs information on the avoidance non-target object, that is, the DM data set as the avoidance non-target object, to the vehicle control unit 15. In this case, similarly, because either the sensor used in the DM creation device 30 or any of the sensors of the vehicle-mounted sensor 11 may have a failure, the proximity information processing unit 14 outputs a sensor failure notification representing sensor failure to the DM creation device 30 via the communication unit 16 and to the vehicle-mounted sensor management unit 12, so as to provide a warning about a sensor failure.

When the DM does not contain object data identical or similar to the object data represented by the result of measurement of the vehicle-mounted sensor 11, the proximity information processing unit 14 outputs the object data represented by the result of measurement of the vehicle-mounted sensor 11 to the vehicle control unit 15. At this time, the proximity information processing unit 14 may output the object data represented by the result of measurement of the vehicle-mounted sensor 11 as an avoidance target object or avoidance non-target object described above.

Once the proximity information processing unit 14 outputs a sensor failure notification, the DM creation device 30 and the vehicle-mounted sensor management unit 12 repeatedly receive the sensor failure notification. Therefore, in response to receiving sensor failure notifications a threshold number of times or more within a prescribed period, the DM creation device 30 and the vehicle-mounted sensor management unit 12 may identify the sensor that has erroneously detected the object or the sensor that has failed to detect the object as a failure sensor, so as not to use a result of measurement of the failure sensor in subsequent processes.

The vehicle control unit 15 acquires high-likelihood data of an object estimated to be one and the same object from the surrounding information comparison unit 13, and acquires information on an avoidance target object and an avoidance non-target object from the proximity information processing unit 14. The vehicle control unit 15 controls traveling of the vehicle 20 by controlling the accelerator, brake, steering, and the like (not illustrated) using data of the object estimated to be the one and the same object and information of an avoidance target object and an avoidance non-target object. When the vehicle control unit 15 acquires information of an avoidance target object from the proximity information processing unit 14, the vehicle control unit 15 controls traveling of the vehicle 20 so as to immediately avoid the obstacle represented by the avoidance target object. When the vehicle control unit 15 acquires information of an avoidance non-target object from the proximity information processing unit 14, the vehicle control unit 15 uses the data on the object estimated to be the one and the same object and the information of the avoidance non-target object to execute normal traveling control for traveling on a path with a low probability of collision. As normal traveling control, for example, the vehicle control unit 15 controls traveling of the vehicle 20 while computing the existence probability distribution of objects, that is, obstacles. As a method of obtaining existence probability distribution of obstacles, use is made of a method described in the International Publication No. 2017/002590 and more, but the disclosure is not limited to this method. When the vehicle control unit 15 acquires neither information of an avoidance target object nor information of an avoidance non-target object from the proximity information processing unit 14, the vehicle control unit 15 controls traveling of the vehicle 20 using the data of the object estimated to be the one and the same object. The vehicle control unit 15 reflects the DM generated by the DM creation device 30 and the result of measurement of the vehicle-mounted sensor 11 in the existence probability distribution of obstacles and the like, and determines the traveling path of the vehicle 20 so as to avoid obstacles.

Figure 2:
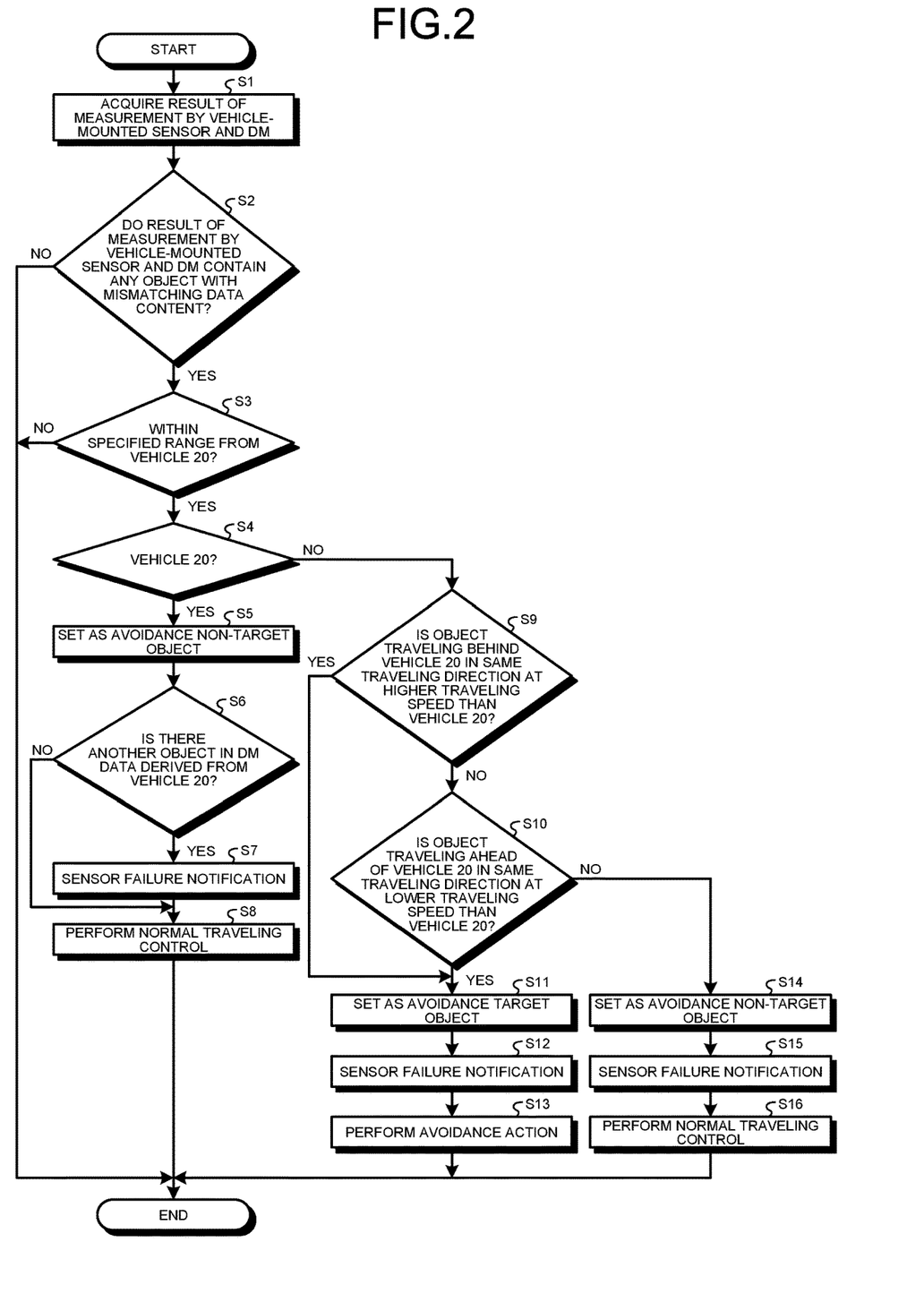
FIG. 2 is a flowchart illustrating a process in which the vehicle traveling control device according to the first embodiment controls traveling of the vehicle.

Next, a process in which the vehicle traveling control device 10 controls traveling of the vehicle 20 will be described. FIG. 2 is a flowchart illustrating a process in which the vehicle traveling control device 10 according to the first embodiment controls traveling of the vehicle 20. In the vehicle traveling control device 10, the surrounding information comparison unit 13 acquires a result of measurement of the vehicle-mounted sensor 11 from the vehicle-mounted sensor management unit 12, and acquires a DM created by the DM creation device 30 from the communication unit 16 (step S1).

The surrounding information comparison unit 13 determines whether or not the result of measurement of the vehicle-mounted sensor 11 and the DM cover any object with mismatch in data content (step S2). When the surrounding information comparison unit 13 determines that there is no object with mismatch in data content (step S2: No), the surrounding information comparison unit 13 ends the process. When the surrounding information comparison unit 13 determines that there is an object with mismatch in data content (step S2: Yes), the surrounding information comparison unit 13 determines whether or not the position of the object with mismatch in data content is within a specified range from the vehicle 20 (step S3). When the surrounding information comparison unit 13 determines that the position of the object with mismatch in data content is not within the specified range from the vehicle 20 (step S3: No), the surrounding information comparison unit 13 ends the process. When the surrounding information comparison unit 13 determines that the position of the object with mismatch in data content is within the specified range from the vehicle 20 (step S3: Yes), the surrounding information comparison unit 13 outputs, to the proximity information processing unit 14, DM data and data of the result of measurement of the vehicle-mounted sensor 11 which represent the object within the specified range.

The proximity information processing unit 14 determines whether or not the object with mismatch in data content represented only by the DM data is the vehicle 20 (step S4). When the proximity information processing unit 14 determines that the object represented only by the DM data is the vehicle 20 (step S4: Yes), the proximity information processing unit 14 sets the object represented only by the DM data as an avoidance non-target object (step S5). When there is another object with mismatch in data content, which is represented only by the DM data and derived from the vehicle 20 (step S6: Yes), the proximity information processing unit 14 outputs a sensor failure notification to the DM creation device 30 via the communication unit 16, so as to provide a warning on a sensor failure (step S7). When there is no other object with mismatch in data content, which is represented only by the DM data and derived from the vehicle 20 (step S6: No), the proximity information processing unit 14 does not output a sensor failure notification to the DM creation device 30 and the vehicle-mounted sensor management unit 12 and does not give the sensor failure warning. After step S6: No or step S7, the proximity information processing unit 14 outputs information of the avoidance non-target object to the vehicle control unit 15.

The vehicle control unit 15 acquires the information on the avoidance non-target object from the proximity information processing unit 14, but immediate avoidance of the obstacle represented by the avoidance non-target object is not required. Therefore, the vehicle control unit 15 performs normal traveling control for the vehicle 20 (step S8).

When the proximity information processing unit 14 determines that the object represented only by the DM data is not the vehicle 20, that is, it is an object other than the vehicle 20 (step S4: No), the proximity information processing unit 14 determines whether or not the object represented only by the DM data is an object traveling behind the vehicle 20 in the same traveling direction as the vehicle 20 at a higher traveling speed than the vehicle 20 (step S9). When the proximity information processing unit 14 determines that the object represented only by the DM data is not an object traveling behind the vehicle 20 in the same traveling direction as the vehicle 20 at a higher traveling speed than the vehicle 20 (step S9: No), the proximity information processing unit 14 determines whether or not the object represented only by the DM data is an object traveling ahead of the vehicle 20 in the same traveling direction as the vehicle 20 at a lower traveling speed than the vehicle 20 (step S10). When the proximity information processing unit 14 determines that the object represented only by the DM data is an object traveling behind the vehicle 20 in the same traveling direction as the vehicle 20 at a higher traveling speed than the vehicle 20 (step S9: Yes) or an object traveling ahead of the vehicle 20 in the same traveling direction as the vehicle 20 at a lower traveling speed than the vehicle 20 (step S10: Yes), the proximity information processing unit 14 sets the object represented only by the DM data as an avoidance target object (step S11). The proximity information processing unit 14 outputs a sensor failure notification to the DM creation device 30 via the communication unit 16 and to the vehicle-mounted sensor management unit 12, so as to make a warning about a sensor failure (step S12). The proximity information processing unit 14 outputs information on the avoidance target object to the vehicle control unit 15.

In response to acquiring the information of the avoidance target object from the proximity information processing unit 14, the vehicle control unit 15 performs an avoidance action to cause the vehicle 20 to immediately avoid the obstacle represented by the avoidance target object (step S13).

When the proximity information processing unit 14 determines that the object represented only by the DM data is not an object traveling ahead of the vehicle 20 in the same traveling direction as the vehicle 20 at a lower traveling speed than the vehicle 20 (step S10: No), the proximity information processing unit 14 sets the object represented only by the DM data as an avoidance non-target object (step S14). The proximity information processing unit 14 outputs a sensor failure notification to the DM creation device 30 via the communication unit 16 and to the vehicle-mounted sensor management unit 12, so as to provide a warning on a sensor failure (step S15). The proximity information processing unit 14 outputs information of the avoidance non-target object to the vehicle control unit 15.

The vehicle control unit 15 acquires the information of the avoidance non-target object from the proximity information processing unit 14, but immediate avoidance of the obstacle represented by the avoidance non-target object is not required. Therefore, the vehicle control unit 15 performs normal traveling control for the vehicle 20 (step S16).

Here, the hardware configuration of the vehicle traveling control device 10 will be described. In the vehicle traveling control device 10, the vehicle-mounted sensor 11 is configured by the above-mentioned sensors. The communication unit 16 is a communication device. The vehicle-mounted sensor management unit 12, the surrounding information comparison unit 13, the proximity information processing unit 14, and the vehicle control unit 15 are implemented by a processing circuit. The processing circuit may be of dedicated hardware, or may be a control circuit including a memory and a processor that executes a program stored in the memory. The processor may be a central processing unit (CPU), a central processing device, a processing device, an arithmetic device, a microprocessor, a microcomputer, a digital signal processor (DSP), or the like. The memory is, for example, a non-volatile or volatile semiconductor memory, a magnetic disk, a flexible disk, an optical disc, a compact disc, a mini disc, a digital versatile disc (DVD), or the like. The non-volatile or volatile semiconductor memory is exemplified by a random access memory (RAM), a read only memory (ROM), a flash memory, an erasable programmable read only memory (EPROM), an electrically erasable programmable read only memory (EEPROM (registered trademark)), or the like.

Figure 3:
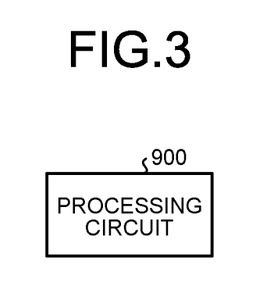
FIG. 3 is a diagram illustrating an example in which a processing circuit provided in the vehicle traveling control device according to the first embodiment is configured by dedicated hardware.

FIG. 3 is a diagram illustrating an example in which a processing circuit provided in the vehicle traveling control device 10 according to the first embodiment is configured by dedicated hardware. When the processing circuit is implemented by dedicated hardware, the processing circuit is a processing circuit 900 illustrated in FIG. 3. The processing circuit 900 is, for example, a single circuit, a composite circuit, a programmed processor, a parallel programmed processor, an application specific integrated circuit (ASIC), a field programmable gate array (FPGA), or a combination thereof.

Figure 4:
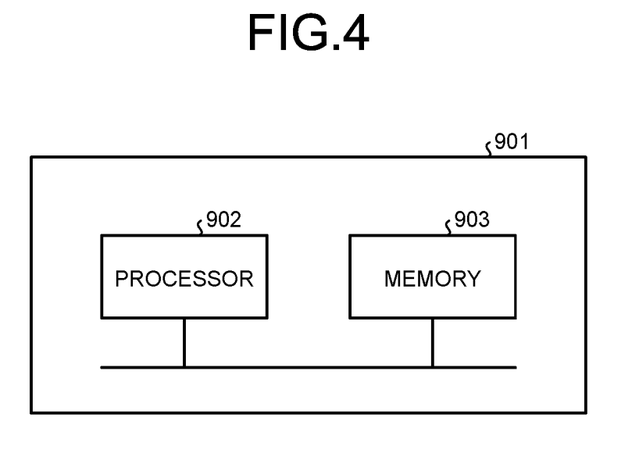
FIG. 4 is a diagram illustrating an example in which a processing circuit provided in the vehicle traveling control device according to the first embodiment is configured by a control circuit including a processor.

FIG. 4 is a diagram illustrating an example in which a processing circuit provided in the vehicle traveling control device 10 according to the first embodiment is configured by a control circuit including a processor. When the processing circuit is configured by a control circuit including a processor, the control circuit is, for example, a control circuit 901 illustrated in FIG. 4. The control circuit 901 includes a processor 902 and a memory 903. The processing circuit provided in the vehicle traveling control device 10 is implemented by the processor 902 reading and executing a program corresponding to each component stored in the memory 903. The memory 903 is also used as a temporary memory for each process executed by the processor 902.

As described above, according to the present embodiment, when a result of measurement of the vehicle-mounted sensor 11 mounted on the vehicle 20 and a DM created by the DM creation device 30 contain an object with mismatch in data content, the vehicle traveling control device 10 sets an object represented by the data and having a certain probability of collision within the specified range from the vehicle 20 as an avoidance target object, and performs an avoidance action. When there is the object with mismatch in data content, the vehicle traveling control device 10 sets the object represented by the data as an avoidance non-target object if the object is the vehicle 20 or an object having no probability of collision within the specified range from the vehicle 20, and performs normal traveling control. As a result, the vehicle traveling control device 10 can prevent abnormal operation caused by misidentification of an obstacle during automatic traveling control using a result of measurement of the vehicle-mounted sensor 11 and the DM. In addition, when a result of measurement of the vehicle-mounted sensor 11 mounted on the vehicle 20 and a DM created by the DM creation device 30 contain an object with mismatch in data content, the vehicle traveling control device 10 can warn the DM creation device 30 or the DM creation device 30 and the vehicle-mounted sensor management unit 12 of a sensor failure.

Second Embodiment

In the first embodiment, the vehicle control unit 15 of the vehicle traveling control device 10 immediately performs an avoidance action for the avoidance target object set by the proximity information processing unit 14. In the second embodiment, the vehicle control unit 15 computes the existence probability distribution in consideration of the avoidance target object set by the proximity information processing unit 14, and accordingly controls traveling of the vehicle 20. Differences from the first embodiment will be described.

Figure 5:
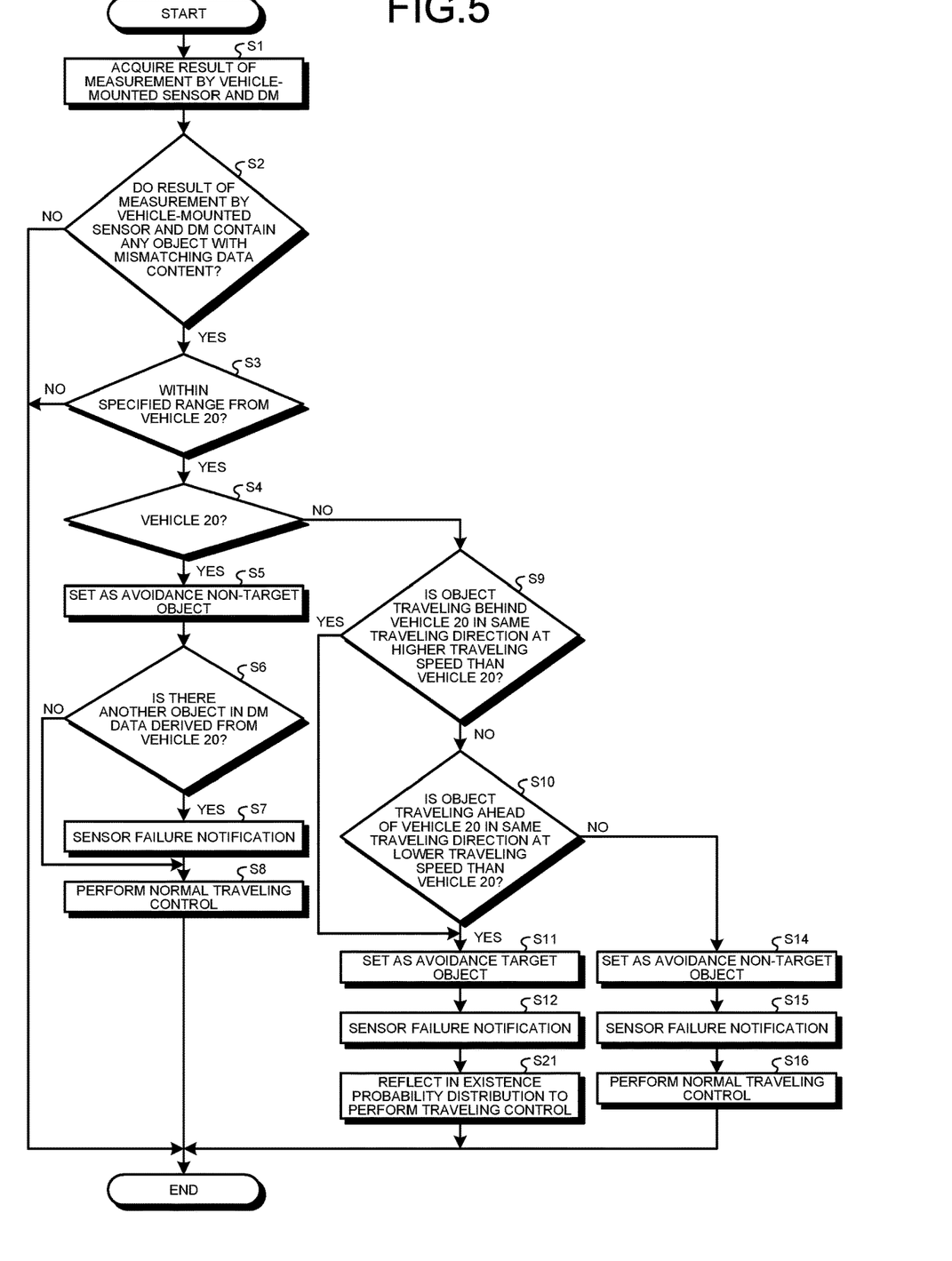
FIG. 5 is a flowchart illustrating a process in which a vehicle traveling control device according to a second embodiment controls traveling of the vehicle.

In the second embodiment, the configuration of the vehicle traveling control device 10 is the same as that in the first embodiment illustrated in FIG. 1. FIG. 5 is a flowchart illustrating a process in which the vehicle traveling control device 10 according to the second embodiment controls traveling of the vehicle 20. The flowchart of the second embodiment illustrated in FIG. 5 is obtained by replacing step S13 of the flowchart of the first embodiment illustrated in FIG. 2 with step S21. In response to acquiring the information of the avoidance target object from the proximity information processing unit 14, the vehicle control unit 15 integrates the high-likelihood data of an object estimated to be one and the same object acquired from the surrounding information comparison unit 13 with the information of the avoidance target object, and reflects the information of the avoidance target object in the existence probability distribution of obstacles to accordingly perform the traveling control (step S21). In this way, the vehicle control unit 15 controls traveling of the vehicle 20 based on the existence probability distribution of obstacles using the data of an object estimated to be the one and the same object and the information of the avoidance target object.

As described above, according to the present embodiment, the vehicle traveling control device 10 performs traveling control while reflecting the information on an avoidance target object in the existence probability distribution of obstacles. By doing so, even when detecting an avoidance target object, the vehicle traveling control device 10 can determine the traveling route for the vehicle 20 based on normal traveling control according to the existence probability distribution of obstacles and avoid collision with obstacles.

Third Embodiment

In the second embodiment, the vehicle control unit 15 of the vehicle traveling control device 10 controls traveling of the vehicle 20 with the avoidance target object set by the proximity information processing unit 14 being reflected in the existence probability distribution. In the third embodiment, the vehicle control unit 15 controls traveling of the vehicle 20 with the DM data determined by the proximity information processing unit 14 not to be the vehicle 20 being reflected in the existence probability distribution. Differences from the first and second embodiments will be described.

Figure 6:
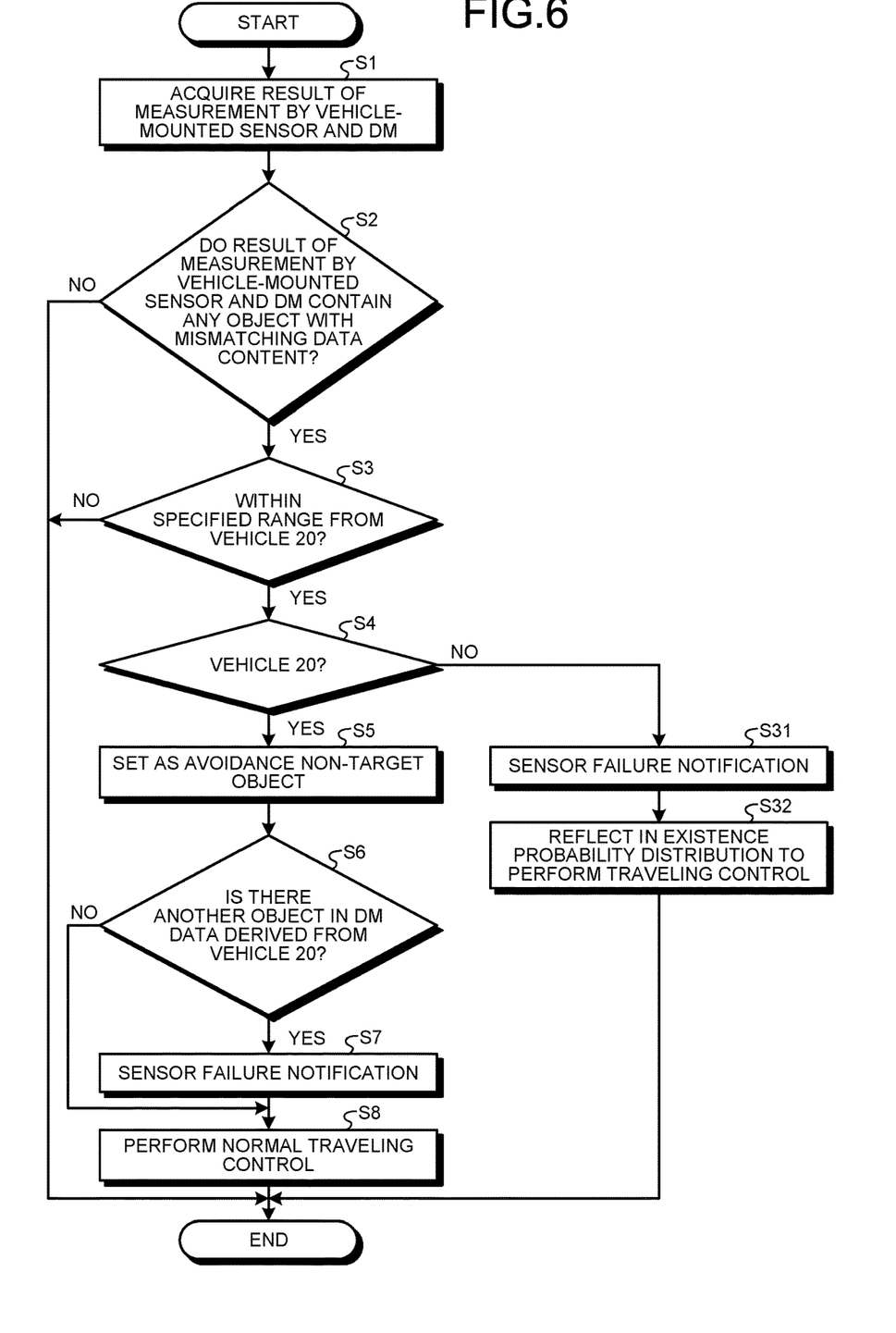
FIG. 6 is a flowchart illustrating a process in which a vehicle traveling control device according to a third embodiment controls traveling of the vehicle.

In the third embodiment, the configuration of the vehicle traveling control device 10 is the same as that in the first embodiment illustrated in FIG. 1. FIG. 6 is a flowchart illustrating a process in which the vehicle traveling control device 10 according to the third embodiment controls traveling of the vehicle 20. In the flowchart of the third embodiment illustrated in FIG. 6, a process of steps S1 to S8 is the same as a process of steps S1 to S8 of the flowchart of the first embodiment illustrated in FIG. 2. When the proximity information processing unit 14 determines that the object represented only by the DM data is not the vehicle 20 (step S4: No), the proximity information processing unit 14 outputs a sensor failure notification to the DM creation device 30 via the communication unit 16 and to the vehicle-mounted sensor management unit 12, so as to give a warning on a sensor failure (step S31). The proximity information processing unit 14 outputs the DM data determined to represent an object other than the vehicle 20 to the vehicle control unit 15.

In response to acquiring the DM data determined to represent an object other than the vehicle 20 from the proximity information processing unit 14, the vehicle control unit 15 sets the acquired DM data determined to represent an object other than the vehicle 20 as a reflection candidate for existence probability distribution. The vehicle control unit 15 integrates the high-likelihood data of an object estimated to be one and the same object acquired from the surrounding information comparison unit 13 with the information of the reflection candidate for existence probability distribution, and reflects the information of reflection candidate for existence probability distribution in the existence probability distribution of obstacles to accordingly perform the traveling control (step S32). In this way, the vehicle control unit 15 controls traveling of the vehicle 20 based on the existence probability distribution of obstacles using the data of the object estimated to be the one and the same object and the DM data determined by the proximity information processing unit 14 to represent an object other than the vehicle 20.

As described above, according to the present embodiment, when the vehicle traveling control device 10 determines that the object represented only by DM data is not the vehicle 20, the vehicle traveling control device 10 performs traveling control while reflecting the data in the existence probability distribution of obstacles. By so doing, as in the case of the second embodiment, the vehicle traveling control device 10 can determine the traveling route for the vehicle 20 based on normal traveling control according to the existence probability distribution of obstacles and avoid collision with obstacles.

The vehicle traveling control device according to the present disclosure achieves an advantageous effect that it can prevent abnormal operation caused by misidentification of an obstacle during automatic traveling control using a result of measurement of a vehicle-mounted sensor and a dynamic map.

The configurations described in the above-mentioned embodiments illustrate examples of the contents of the present disclosure, and each of them can be combined with other publicly known techniques and partially omitted and/or modified without departing from the scope of the present disclosure.

What is claimed is:

1. A vehicle traveling control device comprising:
   a communication circuit to periodically receive a dynamic map representing a state of objects;
   a vehicle-mounted sensor management circuit to collect, from one or more sensors mounted on a vehicle to measure a state of objects around the vehicle, a result of measurement representing the state of objects around the vehicle;
   a comparator to compare object data represented by the dynamic map with object data represented by the result of measurement, and in response to finding mismatching object data, detect, from the mismatching object data, data of the dynamic map representing an object located within a specified range from the vehicle; and
   a proximity information processor to set, from the data of the dynamic map detected by the comparator, data representing the vehicle as an avoidance non-target object that is an object to be excluded from objects to be avoided in traveling control for the vehicle, and set data representing an object other than the vehicle as an avoidance target object that is an object to be avoided in traveling control for the vehicle or as the avoidance non-target object, such that the vehicle traveling control device performs an object avoidance action to avoid colliding with the object based on the set avoidance target object.

2. The vehicle traveling control device according to claim 1, wherein
   when the data of the dynamic map detected by the comparator represents an object other than the vehicle, the proximity information processor warns, via the communication circuit, a device that creates the dynamic map of a sensor failure, and warns the vehicle-mounted sensor management circuit of a sensor failure.

3. The vehicle traveling control device according to claim 1, wherein
   when the data of the dynamic map detected by the comparator represents the vehicle, the proximity information processor does not warn a device that creates the dynamic map and the vehicle-mounted sensor management circuit of a sensor failure.

4. The vehicle traveling control device according to claim 1, wherein
   the proximity information processor sets, as the avoidance target object, from the data of the dynamic map detected by the comparator, data representing the object other than the vehicle in which the object represented by the data is either an object traveling ahead of the vehicle in the same traveling direction as the vehicle at a lower traveling speed than the vehicle or an object traveling behind the vehicle in the same traveling direction as the vehicle at a higher traveling speed than the vehicle.

5. The vehicle traveling control device according to claim 1, wherein
   the proximity information processor sets, as the avoidance non-target object, from the data of the dynamic map detected by the comparator, data representing the object other than the vehicle in which the object represented by the data does not correspond to any of an object traveling ahead of the vehicle in the same traveling direction as the vehicle at a lower traveling speed than the vehicle and an object traveling behind the vehicle in the same traveling direction as the vehicle at a higher traveling speed than the vehicle.

6. The vehicle traveling control device according to claim 1, wherein
   when comparing the object data represented by the dynamic map with the object data represented by the result of measurement, the comparator determines whether or not matching is found using one or more of a position, speed, and size of an object represented by the data.

7. The vehicle traveling control device according to claim 1, further comprising:
   a vehicle controller to control traveling of the vehicle using data of the object estimated to be one and the same object by comparing the object data represented by the dynamic map with the object data represented by the result of measurement in the comparator, and using information on the avoidance target object and the avoidance non-target object.

8. The vehicle traveling control device according to claim 7, wherein
   the vehicle controller controls traveling of the vehicle to avoid the object represented by the data set as the avoidance target object.

9. The vehicle traveling control device according to claim 7, wherein
   the vehicle controller controls traveling of the vehicle based on an existence probability distribution of obstacles using the data of an object estimated to be the one and the same object and the information on the avoidance target object.

10. The vehicle traveling control device according to claim 7, wherein
the vehicle controller controls traveling of the vehicle based on an existence probability distribution of obstacles using the data of an object estimated to be the one and the same object and the data of the dynamic map determined by the proximity information processor to represent an object other than the vehicle.

11. A vehicle traveling control method comprising:
a first step of periodically receiving a dynamic map representing a state of objects;
a second step of collecting, from one or more sensors mounted on a vehicle to measure a state of an object around the vehicle, a result of measurement representing a state of an object around the vehicle;
a third step of comparing object data represented by the dynamic map with object data represented by the result of measurement, and in response to finding mismatching object data, detecting, from the mismatching object data, data of the dynamic map representing an object located within a specified range from the vehicle; and
a fourth step of setting from the received dynamic map, data representing the vehicle as an avoidance non-target object that is an object to be excluded from objects to be avoided in traveling control for the vehicle, and setting data other than the data representing the vehicle as an avoidance target object that is an object to be avoided in traveling control for the vehicle or as the avoidance non-target object, to perform an object avoidance action to avoid colliding with the object based on the set avoidance target object.

12. A control circuit for controlling a vehicle traveling control device, the control circuit causing the vehicle traveling control device to perform:
periodically receiving a dynamic map representing a state of objects;
collecting, from one or more sensors mounted on a vehicle to measure a state of objects around the vehicle, a result of measurement representing the state of objects around the vehicle;
comparing object data represented by the dynamic map with object data represented by the result of measurement, and in response to finding mismatching object data, detecting, from the mismatching object data, data of the dynamic map representing an object located within a specified range from the vehicle; and
setting, from the detected data of the dynamic map, data representing the vehicle as an avoidance non-target object that is an object to be excluded from objects to be avoided in traveling control for the vehicle, and setting data representing an object other than the vehicle as an avoidance target object that is an object to be avoided in traveling control for the vehicle or as the avoidance non-target object, to perform an object avoidance action to avoid colliding with the object based on the set avoidance target object.

13. A storage medium in which a program configured to control a vehicle traveling control device is stored, the program causing the vehicle traveling control device to perform:
periodically receiving a dynamic map representing a state of objects;
collecting, from one or more sensors mounted on a vehicle to measure a state of objects around the vehicle, a result of measurement representing the state of objects around the vehicle;
comparing object data represented by the dynamic map with object data represented by the result of measurement, and in response to finding mismatching object data, detecting, from the mismatching object data, data of the dynamic map representing an object located within a specified range from the vehicle; and
setting, from the detected data of the dynamic map, data representing the vehicle as an avoidance non-target object that is an object to be excluded from objects to be avoided in traveling control for the vehicle, and setting data representing an object other than the vehicle as an avoidance target object that is an object to be avoided in traveling control for the vehicle or as the avoidance non-target object, to perform an object avoidance action to avoid colliding with the object based on the set avoidance target object.

\* \* \* \* \*